(12) United States Patent
Zurek et al.

(10) Patent No.: US 6,363,139 B1
(45) Date of Patent: Mar. 26, 2002

(54) OMNIDIRECTIONAL ULTRASONIC COMMUNICATION SYSTEM

(75) Inventors: Robert A. Zurek, Antioch; Aaron Dietrich, Caledonia; Michael L. Charlier, Palatine, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/596,100

(22) Filed: Jun. 16, 2000

(51) Int. Cl.[7] ................................................. H04Q 7/20
(52) U.S. Cl. ........................ 379/56.1; 455/90; 455/569; 381/111; 310/324
(58) Field of Search ........................... 379/56.1, 428.01, 379/428.02, 433.01, 433.02, 432; 455/90, 347, 568, 569, 350, 575; 381/111, 114, 190, 173; 310/324, 328, 800

(56) References Cited

U.S. PATENT DOCUMENTS

| | | | |
|---|---|---|---|
| 3,974,451 A | 8/1976 | Maeder | 325/392 |
| 4,757,821 A | 7/1988 | Snyder | 128/660 |
| 4,969,180 A | 11/1990 | Watterson et al. | 379/58 |
| 5,150,415 A | 9/1992 | Jaffee et al. | 381/104 |
| 5,185,728 A | 2/1993 | Gilchrist | 367/163 |
| 5,410,587 A | 4/1995 | Grunwell | 379/56 |
| 5,721,783 A | 2/1998 | Anderson | 381/68.6 |
| 5,909,490 A | 6/1999 | Sokolich et al. | 379/433 |
| 5,926,532 A * | 7/1999 | Peck | 455/568 |
| 6,011,855 A * | 1/2000 | Selfridge et al. | 381/111 |
| 6,266,516 B1 * | 7/2001 | Palkki et al. | 455/90 |

* cited by examiner

*Primary Examiner*—Nay Maung
(74) *Attorney, Agent, or Firm*—Brian M. Mancini

(57) ABSTRACT

An ultrasonic communication system includes an omnidirectional ultrasonic transducer including a housing having a closed side and an open side defining an aperture in the housing. A diaphragm is mounted into the housing to form a sealed cavity between the diaphragm and the closed side of the housing. A second side of the diaphragm is free to transmit ultrasonic signals through the aperture. The diaphragm and aperture both have a largest dimension that is less than or equal to one-quarter wavelength of an ultrasonic signal to be transmitted by the transducer, such that the transducer behaves as a monopole and radiates substantially omnidirectionally.

20 Claims, 3 Drawing Sheets

OMNIDIRECTIONAL ULTRASONIC COMMUNICATION SYSTEM

FIELD OF THE INVENTION

The present invention relates generally to wireless communication, and more particularly to an arrangement for ultrasonic wireless communication.

BACKGROUND OF THE INVENTION

Consumer markets continue to request wireless electronic devices. Examples of such devices include accessories for computers, computer peripherals, and cellular telephones to name but a few. Current wireless communication can be accomplished by radio frequency carrier, optical link, or ultrasonic link.

Optical link interconnects have the problem of limited directivity, allowing them to be used only for line-of-sight communication. RF signals overcome the directivity problem, but interference, both of the signal and by the signal, can be a problem. For this reason, RF communication is regulated by the government as far as the amount of permissible power transmitted and of interference. Ultrasonic transmission is unregulated, but can also suffer from directivity problems. Moreover, RF circuitry is complicated and bulky, requiring antennas, mixers, and the like.

The marketplace also demands that wireless communication have a privacy-mode of operation. This is difficult to achieve with RF communications due to its radiative nature and the size of the necessary components can be cumbersome. Optical links can provide privacy due to their directivity, but the connection must be line of sight. In both cases power usage is an issue in portable devices as far as extending battery life.

Accordingly, there is a need for a wireless communication system that has the benefits of having a privacy mode of operation, but is not limited to line-of-sight operation. It would also be of benefit if the communication were not regulated. It would also be an advantage to provide a wireless system that provides good signal quality without consuming a relatively large amount of power and without being too expensive.

DETAILED DESCRIPTION OF THE PREFERRED EMBODIMENTS

Figure 1:
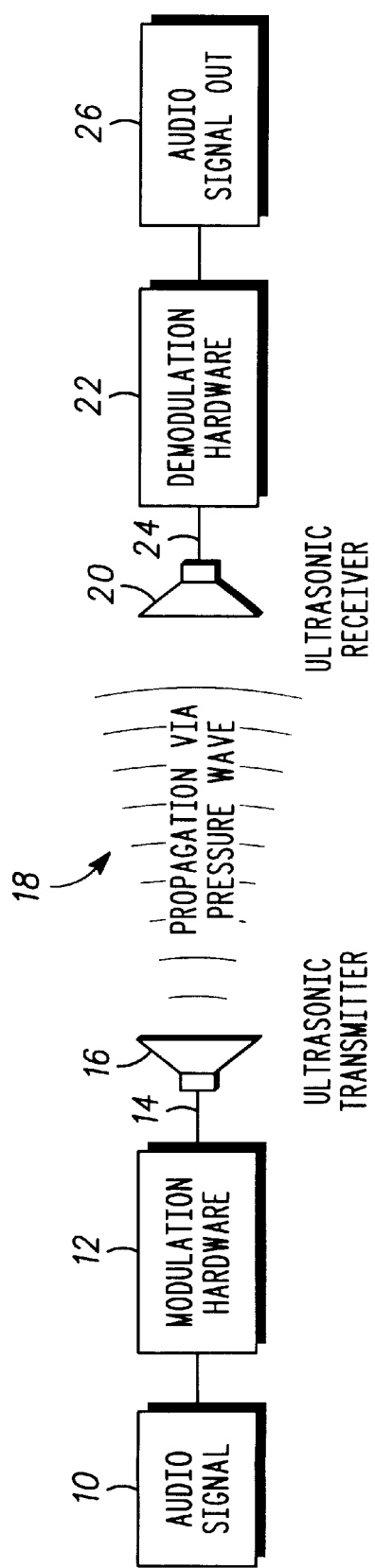
FIG. 1 illustrates a simplified schematic block diagram of a prior art ultrasonic communication system.

The present invention provides a communication system using an omnidirectional ultrasonic link. The configuration for the present invention provides substantially omnidirectional signal dispersion, at a low power, using compact components, within a limited range for privacy. The resulting configuration provides good signal quality and is low-cost.

While the specification concludes with claims defining the features of the invention that are regarded as novel, it is believed that the invention will be better understood from a consideration of the following description in conjunction with the drawing figures, in which like reference numerals are carried forward.

An audio communication system using a wireless ultrasonic link, as is known in the art, is shown in FIG. 1. The system consists of modulating hardware 12 which modulates an input audio signal 10 with an ultrasonic carrier. Various modulation schemes as are known in the art can be used. The modulated signal 14 is passed to an ultrasonic transmitter 16, such as a piezoceramic speaker or dynamic transducer, which converts the modulated signals 14 to an acoustic signal 18 that propagates in the air. An ultrasonic receiver 20 or microphone, receives the incoming ultrasonic acoustic waves 18 and converts it to an electrical signal 24 which is passed to demodulation hardware 22 where the original signal is recovered and output as audio 26. Typically, the demodulation hardware 22 includes a gain stage to provide amplification for the receiver signal to compensate for the weakening of the acoustic wave 18 as it propagates through the air.

Ultrasonic transducers are by their nature very directional devices. In most applications this is a desirable characteristic. However, in a communications application this particular property of ultrasonic transducers limits usefulness. The directionality of an ultrasonic transducer has to do with the size of the transducer, an aperture of the transducer housing, the addition and canceling effect due to the phasing of the backpressure wave from the transducer, and the vibrational modes and modal breakup of the transducer diaphragm. In general, when the wavelength of the acoustic wave is of the same magnitude or smaller than the transducer diaphragm producing it, the phase difference of the wavefront being produced by various sections of the diaphragm results in a directional radiating pattern. In addition, when the signal emanating from the rear of the transducer is not eliminated, the propagation pattern can vary from a simple bi-directional pattern to a very narrow beam or multi-lobed beam, as is known in the art.

Prior art methods to broaden the beam typically include the use of a small aperture in front of the transducer, wherein the aperture is much smaller than the size of the transducer diaphragm. In practice, the aperture is sized to be smaller than one-quarter wavelength of the operating frequency of the diaphragm. Unfortunately, the use of a small aperture in front of a large diaphragm results in lowered efficiency and a reduction in output sound pressure level. The cavity formed behind the reduced aperture acts as an acoustic stiffness which raises the system resonant frequency reducing the usable bandwidth. The small aperture itself has an inherent loss due to the viscous drag of air at the air/wall interface which acts similar to a resistance which lowers the output of the transducer. This causes further problems since the use of a large diaphragm produces break-up modes that occur at not much more than the shifted system resonant frequency resulting in a narrow operational bandwidth, or if operated within a break-up mode, lowered efficiency.

In the present invention, a novel approach is taken in the configuration and use of the acoustic transducers in an ultrasonic communication system, by providing a substantially omnidirectional propagation of the acoustic wave without the artificial restriction of a small aperture. In addition, a larger operation bandwidth between the resonant frequency of the transducer and its first break-up mode is provided.

Figure 2:
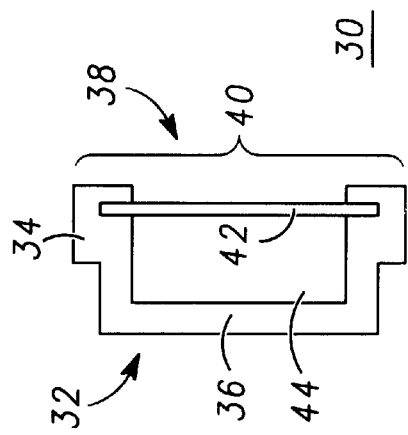
FIG. 2 illustrates a cross section of an omnidirectional ultrasonic transducer, in accordance with the present invention.

As shown in FIG. 2, a transducer 30 is first configured to eliminate any acoustic waves from the rear 32 of the transducer 30. In particular, the transducer 30 includes a housing 34 having a closed side 36 and an open side 38 defining an aperture 40 or opening in the housing 34. A diaphragm 42 or piezoceramic plate is mounted into the housing 34 to form a sealed cavity 44 between a first side of the diaphragm 42 and the closed side 36 of the housing 34. A second side of the diaphragm 42 is free to transmit ultrasonic signals through the aperture 40. Secondly, it should be noted that the diaphragm 42 and aperture 40 both have a largest dimension that is less than or equal to one-quarter wavelength of an ultrasonic signal to be transmitted by the transducer 30. In this way, the transducer 30 behaves as a monopole and radiates substantially omnidirectionally. Preferably, the aperture 40 is a round opening in the housing and the diaphragm 42 is a round piezoceramic plate, with the aperture 40 and diaphragm 42 having substantially the same dimensions. In this case, not only the aperture 40 has a diameter less than or equal to one-quarter wavelength of an ultrasonic signal, but also the diaphragm 42 has diameter less than or equal to one-quarter wavelength of an ultrasonic signal.

Figure 5:
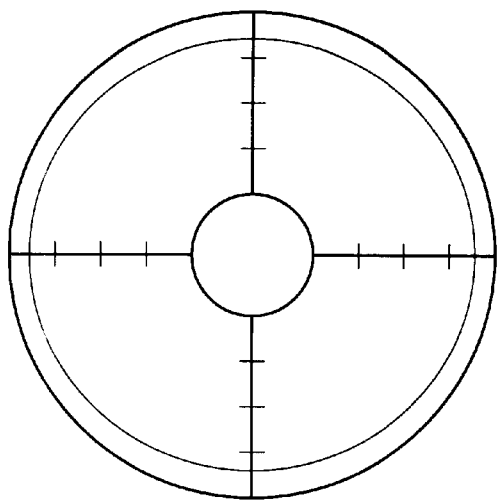
FIGS. 3–5 illustrate a graphical representation of ultrasonic dispersion patterns provided by the transducer of FIG. 2.
Figure 4:
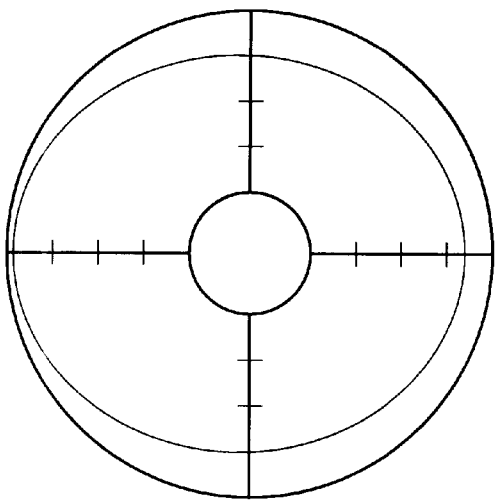
Figure 3:
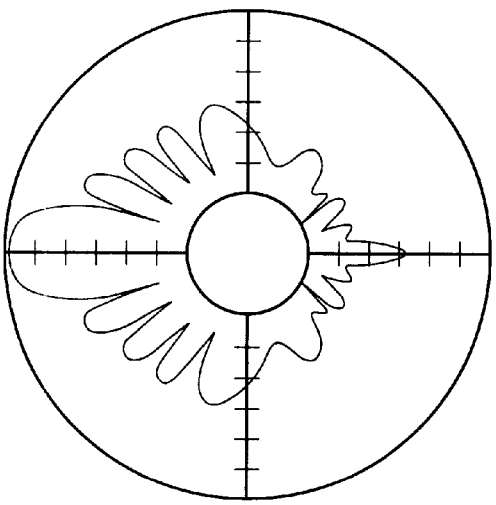

At frequencies where the quarter wavelength of the propagating wave is equal to or larger than the diaphragm (or aperture) diameter, the transducer acts like an ideal point source. It is in this region where the transducer of the present invention is configured. FIGS. 3–5 show a set of propagation maps delineating a uniform output contour for the transducer for FIG. 2 when it is operated at different frequencies. In all cases, the orientation of the transducer is as if it were firing upwards in the figures. FIG. 3 represents the propagation coverage when the transducer is operated at a frequency wherein the plate (aperture) diameter is effectively greater than the wavelength of the operating frequency. This results in multiple beam lobes. FIG. 4 represents the propagation coverage when the transducer is operated at a frequency wherein the plate (aperture) diameter is effectively equal to one-half wavelength of the operating frequency. This results in much more uniform beam spreading. FIG. 5 represents the propagation coverage when the transducer is operated at a frequency wherein the plate (aperture) diameter is effectively less than or equal to one-quarter wavelength of the operating frequency. As can be seen the transducer operation of FIG. 5 is nearly a perfect monopole providing substantially omnidirectional acoustic radiation.

Advantageously, omnidirectionality is achieved with a low-cost, smaller device than the prior art without the losses involved with a restrictive aperture. Further, it was found that the smallness of the device results in a wider operating bandwidth. Not only is the transducer resonant frequency lowered due to less acoustic stiffness than would be present with a front cavity formed behind a restrictive aperture, the first break-up mode is much farther above the resonant mode due to the smaller diaphragm. This results in a much wider operable bandwidth than in the prior art. This can be very useful for those communication applications requiring multiple operating frequencies or frequency hopping, such as in time-division multiple access (TDMA) communications.

The ultrasonic communication system, in accordance with the present invention, has further advantages in that the transducer eliminates the directivity problem of optical links while retaining the privacy aspects, unlike RF links. The power requirements of an ultrasonic link are low. Also, the ultrasonic link is not limited to predefined frequency bands as is RF, and is not regulated as far as output power. In addition, the ultrasonic link will not interfere with any electronic devices, as can RF. Ultrasonic communication lends itself to a wide variety of known modulation, demodulation, and encryption schemes, and data transmitted over the link can be either analog or digital. With the transducer materials currently available, frequency modulation is the preferred modulation method due to non-linearities present in the modulated signal.

In a preferred embodiment of the present invention, the diaphragm 42 is a piezoceramic plate mounted into a small sealed cavity 44 as shown in FIG. 2. The plate and cavity are tuned to the system's resonant frequency. The geometric dimensions of the plate and aperture of the transducer are chosen to be similar or substantially equal such that an omnidirectional passband of the transducer ranges from between the resonant frequency of the transducer to a first frequency break-up mode of the of the plate. Between these two frequency points, the plate provides a uniform output level. The preferred dimensions of the finished transducer including the housing is 4 mm in diameter by 1.5 mm thick.

Figure 6:
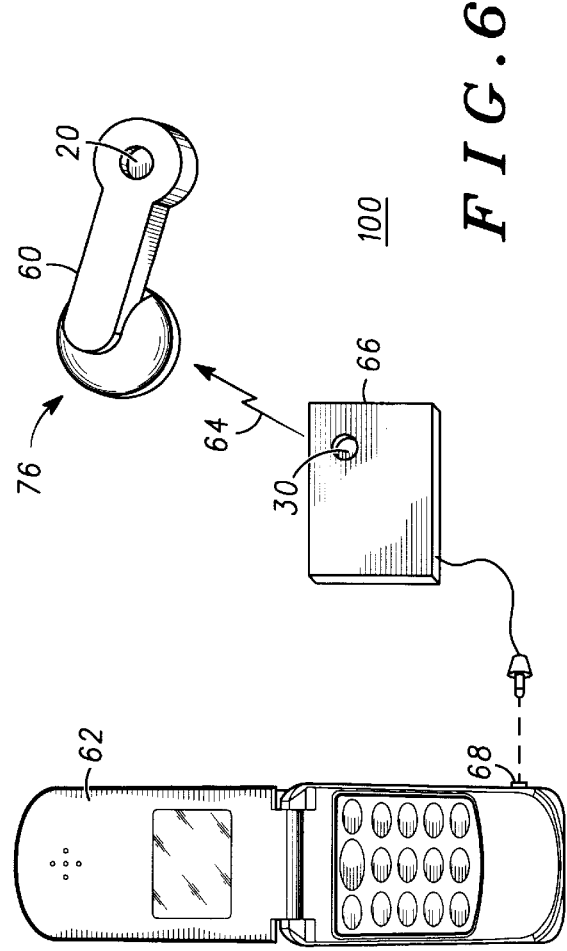
FIG. 6 illustrates a view of a communication system incorporating the ultrasonic transmitter of FIG. 2, in accordance with the present invention.

The present invention further includes an ultrasonic receiver 20 in an earpiece 60 (enlarged) in a communication system 100, as shown in FIG. 6. In the embodiment shown, an earpiece is used as the receiver in the communication system for handsfree, private-mode use. For the example shown, the communication system would be completed by a transmitting transducer 30 with the necessary modulation circuitry placed into, or coupled to, a communication device 62 such as a radiotelephone. However, it should be recognized that the communication system could easily consist of a radiotelephone with an ultrasonic link to an earpiece, a audio system with an ultrasonic link to remote amplified loudspeakers, a controller with an ultrasonic link to a controlled device, and a computer with an ultrasonic data link with an accessory device, among others.

Figure 7:
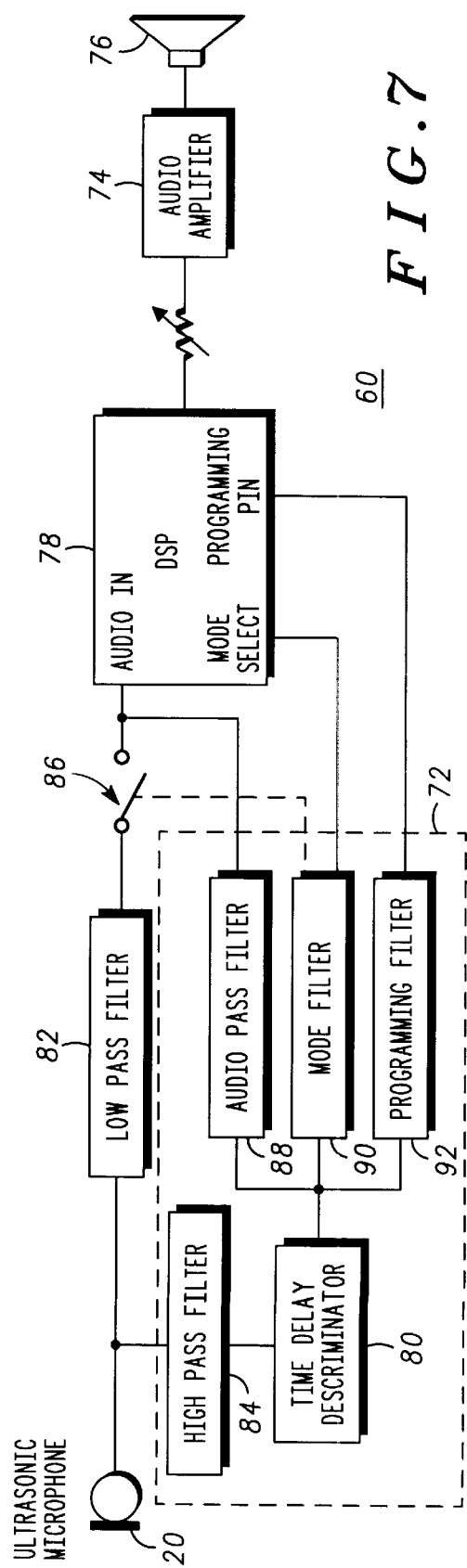
FIG. 7 illustrate a simplified schematic diagram of a communication system utilizing the transducer of FIG. 2 within the earpiece of FIG. 6, in accordance with the present invention.

In the embodiment of FIGS. 6 and 7, an analog frequency modulation system is used wherein an audio signal from the radiotelephone frequency modulates an ultrasonic carrier signal which is used to drive the transducer 30 of FIG. 2 to produce an ultrasonic transmission 64. The earpiece 60 contains an ultrasonic receiver 20, passive demodulation circuitry 72, audio amplification 74, a speaker 76, and a battery (not shown). This configuration is a one-way connection, although two-way communication is also envisioned with the addition of a separate transducer, a microphone, and associated circuitry. The audio signal is modulated in the phone, or through an external modulator/transmitter accesory 66 which plugs into and is driven by the radiotelephone headphone jack 68, and ultrasonically transmitted to the earpiece receiver 20. The signal is then demodulated in the earbud receiver 60, sent through the audio amplifier 74, and then to the speaker 76 for audible reception. More preferably, a digital signal processor 78 can be incorporated into the signal path to provide increased fidelity for those with a hearing defect, for example. The current demodulator 72 in the earpiece 60 incorporates a delay discriminator 80, although other passive devices, such as a simple diode for example, can also work. The delay discriminator 80 is preferred due to its reduce size, cost, power consumption, and ability to be placed in a single 6 or 8-pin IC package with any required filtering already built in. In this way, the earpiece 60 can be designed as a completely-in-the-canal (CIC) earbud. If a greater communication range was desired, a superheterodyne receiver with more sensitivity could be used. However, it should be recognized that there would be compromises in cost, power consumption, and the device could no longer be CIC due to increased size.

In general operation, the modulator 12 in the accessory 66 modulates an incoming signal from the communication device 62 and provides an ultrasonic modulated signal 14. An ultrasonic transmitter is coupled to the modulator in the accesory 66. The ultrasonic transmitter includes the transducer 30 of the present invention configured to transmit the modulated signal 64 in an omnidirectional pattern. An ultrasonic receiver includes an ultrasonic microphone 20 configured (preferably omnidirectional and having extended range) to pick up the modulated signal 64. A demodulator 72 coupled to the ultrasonic microphone 20 converts the modulated signal into an audio signal coupled to the speaker 76.

It should be recognized that the demodulated signal could be used to drive any manner of electrical devices including loudspeakers, amplified loudspeakers, headphones, earpieces, earbuds, control devices, digital data devices, hearing aides, and the like, and that the earpiece embodiment shown is only an example. In a preferred embodiment, the incoming audio signal is input from the audio signal of a radiotelephone, and the audio signal out is supplied to an earpiece worn by a user such that only the user can hear the audio from the radiotelephone. Optionally, the system can be used for two-way communication by placing both ultrasonic transmitters and receivers in each device. Moreover, the same transducer could be used for both transmission and reception if necessary. However, it should be recognized that a loss in receive response level will result until improved transducer materials are introduced.

The radiotelephone portion of the communication system is preferably a cellular radiotelephone adapted for personal communication or personal computing, but may also be a cordless radiotelephone or a personal communication service (PCS) radiotelephone. The radiotelephone portion may be constructed in accordance with an analog communication standard or a digital communication standard. The radiotelephone portion generally includes a radio frequency (RF) transmitter, a RF receiver, a controller, an antenna, batteries, a duplex filter, a frequency synthesizer, a signal processor, and a user interface including at least one of a keypad, control switches, and a display. The radiotelephone portion can also include a paging receiver. If the device incorporates a pager, there might be a small liquid crystal display and an audio annunciator. The electronics incorporated into a portable cellular phone, two-way radio or selective radio receiver, such as a pager, are well known in the art, and may be incorporated into the communication system.

In practice, the radiotelephone provides an audio signal from an incoming RF message. The audio signal is modulated by an ultrasonic carrier and transmitted via the transducer 30 of FIG. 2. The ultrasonic modulator and transducer can be contained within the radiotelephone (not shown). However, it is preferable to provide the modulator and transducer 30 as elements in an external accessory adapter 66 that plugs into the headset jack 68 of an existing radiotelephone 62. In this way, the radiotelephone can be a standard unit requiring no modification. The modulator can be powered off the microphone bias voltage present at the headset jack 68. Further, a microphone and modulator (not shown) can be included in the external adapter to facilitate twoway communication.

The earpiece 60 includes a microphone 20, a demodulator 72, an amplifier 74, and an audio speaker 76. The earpiece 60 receives and demodulates the ultrasonic signal and provides audio output to the user through the speaker 76. Because an earpiece can block normal sounds or conversation in the user's listening environment, it is desirable that the earpiece also pass the normal audio from the environment around the listener. In particular, this requires the use of an extended frequency range microphone 20 in the earpiece 60, one that receives both audio and ultrasonic frequencies. In this embodiment, the earpiece 60 further includes a low pass filter 82 coupled to the microphone 20 of the earpiece 60 to pass background audio signals through the earpiece, and a high pass filter 84 coupled between the microphone 20 and the demodulator 80 to pass ultrasonic signals to the demodulator to be downconverted to an audio signal and thereon to be passed through to the speaker 76.

More preferably, the earpiece 60 allows normal audio when no ultrasonic communications are present, similar to the functions of a hearing aid, and blocks normal audio when ultrasonic communications are present. This can be accomplished with an additional switch 86 or attenuator such that when the demodulator 72, upon reception of an ultrasonic signal, automatically attenuates or cuts off the background audio signals.

The circuitry presently available for hearing aids, can be advantageously used in the present invention. In particular, a digital signal processor 78 (DSP) can be employed in the signal path to modify the audio signal for better fidelity or for filtering in loud or noisy background environments. Alternatively, the present invention can be implemented into existing hearing aid circuits with the addition of a single small IC (represented as 72) and the use of an extended range microphone 20. Since the hearing aid already has a microphone, that microphone could be configured to operate up to the ultrasonic range. The signal received by the microphone would be split by the low and high pass filters into the audio band and the ultrasonic band. The audio information would be coming from the people or noises around the user and fed to the DSP 78, amplifier 74 and speaker 76 through the low pass filter 82. The ultrasonically modulated signal would be fed through the high pass filter 84 to the demodulator 80 to downconvert the signal to audio to be fed back to the audio path. Optionally, the ultrasonic signal can contain data signals that would lie below or above the audio range in the downconverted signal to control the operational mode (to select DSP algorithms depending the source material) or for programming of the DSP. The control signal used to switch modes or provide programming changes could be transmitted within the modulated signal either above or below the phone audio band. For example, data could be placed below 300 Hz or above 5 kHz in the downconverted signal for this purpose. Since it is envisioned that mode changes would be infrequent, it is best to place this signal in the 0–300 Hz range. This would serve two purposes. The first purpose would be to provide a narrow modulated band based on the upper audio frequency range (typically less than 4 kHz). The second purpose would serve to allow a separation between mode switching information and programming information that could be uploaded at an above-audio frequency band (above 20 kHz), which would not be audible when normal audio is being used. Programming information could include items a simple as volume control or as complicated as equalization algorithms optimized to the user's hearing profile, environment, or source material. In such a three band embodiment, the mode, audio and programming signals can be separated by a bank of band-pass filters, e.g. an audio pass filter 88, a mode filter 90, and a programming filter 92, respectively, which are coupled to the DSP 78.

In operation when the radiotelephone receives a call it can use its internal ringer or send a signal to the earpiece to alert the user to the call. When the user presses a button on the phone to answer the call, a signal is sent from the phone to the earpiece to mute or attenuate the background audio, i.e. open the switch 86. This feature can also be used to inform of incoming calls. Attenuating instead of muting allows a user to better understand the call without complete removal of external stimulus which can sometimes be disconcerting.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. An ultrasonic communication system including an omnidirectional transducer, the transducer comprising:
    a housing having a closed side and an open side defining an aperture in the housing; and
    a diaphragm mounted into the housing to form a sealed cavity between a first side of the diaphragm and the closed side of the housing, a second side of the diaphragm being free to transmit ultrasonic signals through the aperture;
    the diaphragm and aperture both have a largest dimension that is less than or equal to one-quarter wavelength of an ultrasonic signal to be transmitted by the transducer, such that the transducer behaves as a monopole and radiates substantially omnidirectionally.

2. The communication system of claim 1, wherein the diaphragm is a piezoceramic plate.

3. The communication system of claim 1, wherein the diaphragm and the sealed cavity of the transducer are configured to be tuned to a resonant frequency of the transducer.

4. The communication system of claim 1, wherein the geometric dimensions of the diaphragm and aperture of the transducer are chosen to be similar.

5. The communication system of claim 1, wherein an omnidirectional passband of the transducer ranges from between the resonant frequency of the transducer to a first frequency break-up mode of the of the diaphragm.

6. The communication system of claim 1, further comprising an ultrasonic receiver, and wherein the communication system consists of one of the group of a radiotelephone with an ultrasonic link to an earpiece, a audio system with an ultrasonic link to remote amplified loudspeakers, a controller with an ultrasonic link to a controlled device, and a computer with an ultrasonic data link with an accessory device.

7. An ultrasonic communication system, comprising:
    a modulator that modulates an incoming signal and provides an ultrasonic modulated signal;
    an ultrasonic transmitter coupled to the modulator, the ultrasonic transmitter including a transducer configured to transmit the modulated signal in an omnidirectional pattern, the transducer comprising a piezoceramic plate mounted into a housing to form a sealed cavity between a first side of the piezoceramic plate and the housing, a second side of the piezoceramic plate being free to transmit ultrasonic signals through an aperture in the housing, the aperture and plate being of similar dimensions;
    an ultrasonic receiver including a microphone configured to pick up the modulated signal; and
    a demodulator coupled to the ultrasonic receiver, the demodulator converts the modulated signal from the receiver into an outgoing signal.

8. The ultrasonic communication system of claim 7, wherein the plate and aperture both have a largest dimension that is less than or equal to one-quarter wavelength of the modulated signal, and wherein an omnidirectional passband of the transducer ranges from below the resonant frequency of the transducer to a first frequency break-up mode of the of the piezoceramic plate such that the transducer behaves as a monopole and radiates substantially omnidirectionally.

9. The ultrasonic communication system of claim 7, wherein the modulator uses analog frequency modulation with an ultrasonic carrier, and the demodulator is a passive delay discriminator that provides an audio output.

10. The ultrasonic communication system of claim 7, wherein the incoming and outgoing signals are at audio frequencies and the microphone is an extended frequency range microphone in an earpiece, and further comprising a low pass filter coupled to the microphone of the earpiece to pass background audio signals through the earpiece and a high pass filter coupled between the microphone and the demodulator to pass ultrasonic signals to the demodulator to be downconverted to an audio signal and thereon to be passed through the earpiece.

11. The ultrasonic communication system of claim 10, wherein the earpiece is a hearing aid.

12. The ultrasonic communication system of claim 10, wherein the demodulator, upon reception of an ultrasonic signal, attenuates the background audio signals.

13. The ultrasonic communication system of claim 12, wherein when the radiotelephone receives a call it sends a signal to the earpiece to alert the user to the call.

14. The ultrasonic communication system of claim 7, wherein the modulator and ultrasonic transmitter are combined into an accessory adapted to be plugged into the headset jack of a radiotelephone.

15. The ultrasonic communication system of claim 7, wherein the modulator uses analog frequency modulation with an ultrasonic carrier, and the demodulator is a passive delay discriminator.

16. An ultrasonic communication system with a radiotelephone and remote earpiece linked ultrasonically, comprising:
    a modulator coupled to the radiotelephone, the modulator modulates an audio signal from the radiotelephone and provides an ultrasonic modulated signal;
    an ultrasonic transmitter coupled to the modulator, the ultrasonic transmitter including a transducer configured to transmit the modulated signal in an omnidirectional pattern, the transducer comprising a piezoceramic plate mounted into a housing to form a sealed cavity between a first side of the piezoceramic plate and the housing, a second side of the piezoceramic plate being free to transmit ultrasonic signals through an aperture in the housing, the aperture and plate being of similar dimensions that is less than or equal to one-quarter wavelength of the modulated signal such that the transducer behaves as a monopole and radiates substantially omnidirectionally;
    an ultrasonic receiver disposed within the remote earpiece, the receiver including an omnidirectional ultrasonic microphone configured to pick up the ultrasonically modulated signal; and
    a demodulator coupled to the ultrasonic receiver, the demodulator converts the received modulated signal from the receiver into an audio signal coupled to a speaker.

17. The system of claim 16, wherein the modulator uses analog frequency modulation with an ultrasonic carrier, and the demodulator is a passive delay discriminator.

18. The system of claim 16, wherein an omnidirectional passband of the transducer ranges from below the resonant frequency of the transducer to a first frequency break-up mode of the of the piezoceramic plate.

19. The system of claim 16, further comprising a low pass filter coupled to the microphone to pass background audio signals to an audio amplifier in the earpiece and a high pass filter coupled between the microphone and the demodulator to pass ultrasonic signals to the demodulator to be down-converted to an audio signal and thereon to the audio amplifier of the earpiece.

20. The system of claim 16, wherein, when the radiotelephone receives a call, a signal is sent to the earpiece to alert the user to the call.

* * * * *